United States Patent
Flaherty

(10) Patent No.: US 8,162,322 B2
(45) Date of Patent: Apr. 24, 2012

(54) HYDRODYNAMIC SEAL WITH CIRCUMFERENTIALLY VARYING LIFT FORCE

(75) Inventor: Andrew L. Flaherty, Lake Zurich, IL (US)

(73) Assignee: Rexnord Industries, LLC, Milwaukee, WI (US)

( * ) Notice: Subject to any disclaimer, the term of this patent is extended or adjusted under 35 U.S.C. 154(b) by 1039 days.

(21) Appl. No.: 11/586,354

(22) Filed: Oct. 25, 2006

(65) Prior Publication Data
US 2008/0100001 A1    May 1, 2008

(51) Int. Cl.
*F16J 15/34*  (2006.01)
(52) U.S. Cl. .................. 277/400; 277/398; 277/401
(58) Field of Classification Search .......... 277/398, 277/400, 401, 408
See application file for complete search history.

(56) References Cited

U.S. PATENT DOCUMENTS

| | | | |
|---|---|---|---|
| 2,768,011 A * | 10/1956 | Mosher | 277/399 |
| 3,499,653 A * | 3/1970 | Gardner | 277/362 |
| 3,638,957 A * | 2/1972 | Marsi | 277/400 |
| 3,744,805 A * | 7/1973 | Heinrich | 277/400 |
| 4,323,255 A * | 4/1982 | Wiese | 277/362 |
| 4,836,561 A | 6/1989 | Lebeck et al. | |
| 5,143,384 A * | 9/1992 | Lipschitz | 277/400 |
| 5,180,172 A * | 1/1993 | Metcalfe | 277/387 |
| 5,201,531 A | 4/1993 | Lai | |
| 5,217,233 A | 6/1993 | Pecht et al. | |
| 5,222,743 A | 6/1993 | Goldswain et al. | |
| 5,224,714 A * | 7/1993 | Kimura et al. | 277/400 |
| 5,375,853 A | 12/1994 | Wasser et al. | |
| 5,529,317 A * | 6/1996 | Muller | 277/400 |
| 5,529,318 A | 6/1996 | Fuse et al. | |
| 5,941,532 A | 8/1999 | Flaherty et al. | |
| 5,947,481 A | 9/1999 | Young | |
| 5,988,888 A | 11/1999 | Une et al. | |
| 6,109,617 A | 8/2000 | Laney | |
| 6,142,478 A * | 11/2000 | Pecht et al. | 277/400 |
| 6,257,589 B1 | 7/2001 | Flaherty et al. | |
| 6,446,976 B1 | 9/2002 | Key et al. | |
| 6,454,268 B1 | 9/2002 | Muraki | |
| 6,494,460 B2 * | 12/2002 | Uth | 277/399 |
| 6,575,470 B1 | 6/2003 | Gacek et al. | |
| 2006/0097457 A1 | 5/2006 | Flaherty | |

FOREIGN PATENT DOCUMENTS

FR    1597609 A    6/1970
GB    2258275 A *  2/1993

* cited by examiner

*Primary Examiner* — Alison Pickard
(74) *Attorney, Agent, or Firm* — Quarles & Brady LLP

(57) ABSTRACT

A seal assembly which operates efficiently at high altitudes and low surface speeds includes a first seal ring, a second seal ring, and hydropads. The first seal ring is of a generally annular shape and defining radial and circumferential directions. The second seal ring is positioned in facing relation to the first seal ring and rotatably mounted relative to the first seal ring about an axis of rotation. A plurality of hydropads formed on one of the first seal ring and second seal ring provides a lift force that varies about the circumference of the mating ring.

23 Claims, 3 Drawing Sheets

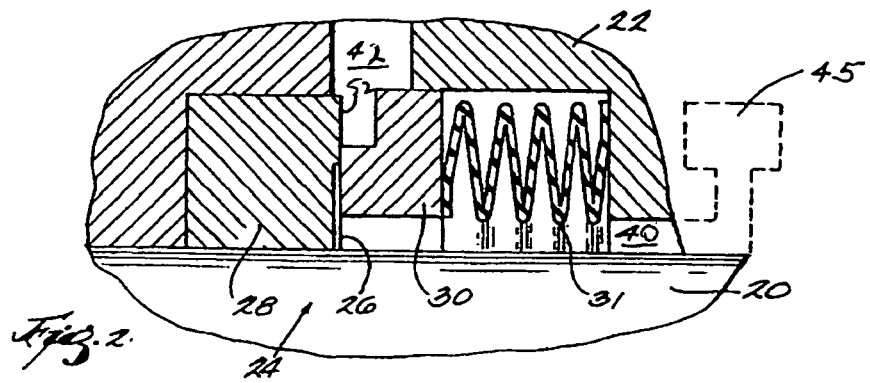
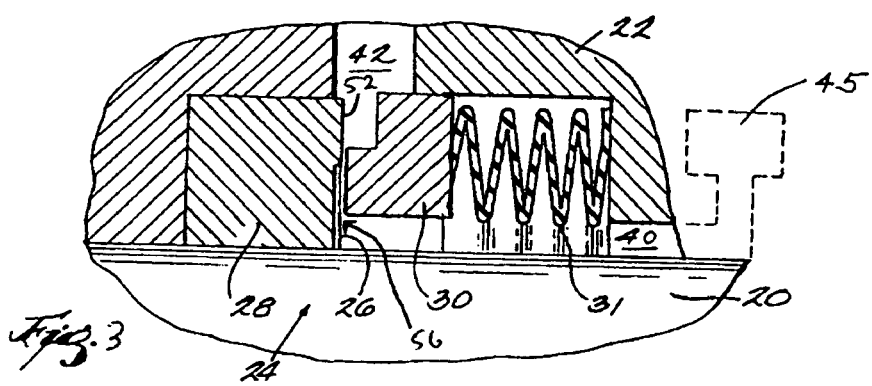
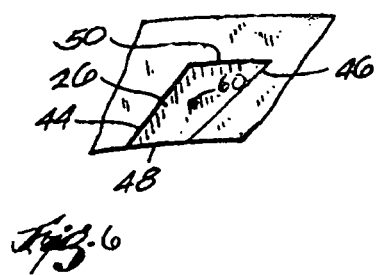

HYDRODYNAMIC SEAL WITH CIRCUMFERENTIALLY VARYING LIFT FORCE

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention generally relates to the field of and shaft assemblies, and more specifically to hydrodynamic seals for providing a barrier between a housing and a shaft.

BACKGROUND OF THE INVENTION

Mechanical face seals are commonly used to provide a seal between a stationary housing and a rotating shaft. Such seals include a rotating ring, or rotor, mounted on the shaft and a stationary ring, or stator, mounted on the housing. Either the stator or the rotor is biased toward the other to provide a biased seal therebetween.

A typical seal design for inhibiting process fluid, whether liquid or gas, from escaping from a housing along a rotating shaft includes two seals in-fluid communication with an intermediate chamber containing a buffer fluid. One seal radially pumps the buffer fluid having a certain pressure across the seal between a stator and rotor into the housing containing the process fluid. The process fluid in the housing has a lower pressure than the buffer fluid in the intermediate chamber. The other seal radially pumps the buffer fluid to an environment external to the housing, such as ambient, which is at a pressure lower than the buffer fluid in the intermediate chamber.

To accomplish this radial pumping, each seal includes spiral grooves on either the face of the stator or rotor. The grooves are angled relative to the radius and circumference of the rotating shaft, and when the rotor is rotating, the grooves radially pump the buffer fluid across the seal. The rotor must be rotated at a speed sufficient to generate a lift force that overcomes the hydraulic and mechanical forces biasing the rotor and stator toward each other in order to create a gap between the rotor and stator through which the buffer fluid is pumped. This pumping of the high-pressure buffer fluid toward the lower-pressure external environment or process fluid inhibits the loss of the process fluid from the housing. U.S. Pat. No. 5,375,853 discloses a seal design of this type.

In another design, grooved face seals are used in pumps to provide a seal between a high-pressure gas (e.g., a combustible gas) and the ambient atmosphere. In this situation, two seals are commonly used. A grooved inner seal radially pumps the high pressure gas to an intermediate chamber, and a grooved outer seal radially pumps from the intermediate chamber to the atmosphere. The intermediate chamber routes the high-pressure gas to a flare stack where the pumped gas is burned. The amount of high-pressure gas that is lost through the outer seal is thereby minimized. An example of this type of seal is disclosed in U.S. Pat. No. 5,217,233.

These types of seals are also used in aerospace applications, such as disclosed in U.S. Pat. Nos. 5,941,532 and 6,257,589, which are assigned to the assignee of the present application and fully incorporated herein. When used in an aerospace application, these seals have a limited operating window in which they are effective. At low surface speeds and high altitude conditions (with very low ambient pressures) it has been discovered that the seals may not generate sufficient lift to overcome hydraulic and mechanical closing forces, resulting in contact between the sealing faces and degraded performance. A need exists for seals which can more effectively operate in low surface speeds/high altitude conditions.

SUMMARY OF THE INVENTION

The present invention provides a seal assembly including a first seal ring of a generally annular shape and defining radial and circumferential directions. A second seal ring is positioned in facing relation to the first seal ring and rotatably mounted relative to the first seal ring about an axis of rotation. A plurality of hydropads formed on one of the first seal ring and second seal ring provides a lift force that varies about the circumference of the mating ring. In one embodiment, hydropads define an eccentric ring about the axis of rotation. In another embodiment, an outer circumference of the hydropads is eccentric relative to said axis of rotation. In yet another embodiment, each of the hydropads of the plurality of hydropads has a nominal center, and the nominal centers are circumferentially spaced about a point offset from the axis of rotation.

A general objective of the present invention is to provide a seal assembly having hydropads that can operate efficiently in high altitudes and with low surface speeds. This objective is accomplished by providing a seal having a lift force which varies about the circumference of the mating ring which allows a squeeze film effect to axially space the first and second rings in high altitudes and at low surface speeds.

These and other aspects of the invention are not intended to define the scope of the invention for which purpose claims are provided. In the following description, reference is made to the accompanying drawings, which form a part hereof, and in which there is shown by way of illustration, and not limitation, preferred embodiments of the invention. Such embodiments do not define the scope of the invention and reference must be made therefore to the claims for this purpose.

BRIEF DESCRIPTION OF THE DRAWINGS

FIG. 2 is a partial cross-section of a rotating shaft positioned in a stationary housing with the seal nose engaging the mating ring;

FIG. 3 is a partial cross-section of a rotating shaft positioned in a stationary housing with the seal nose lifted off the mating ring;

FIG. 6 is an enlarged view of a hydropad.

DETAILED DESCRIPTION

Figure 1:
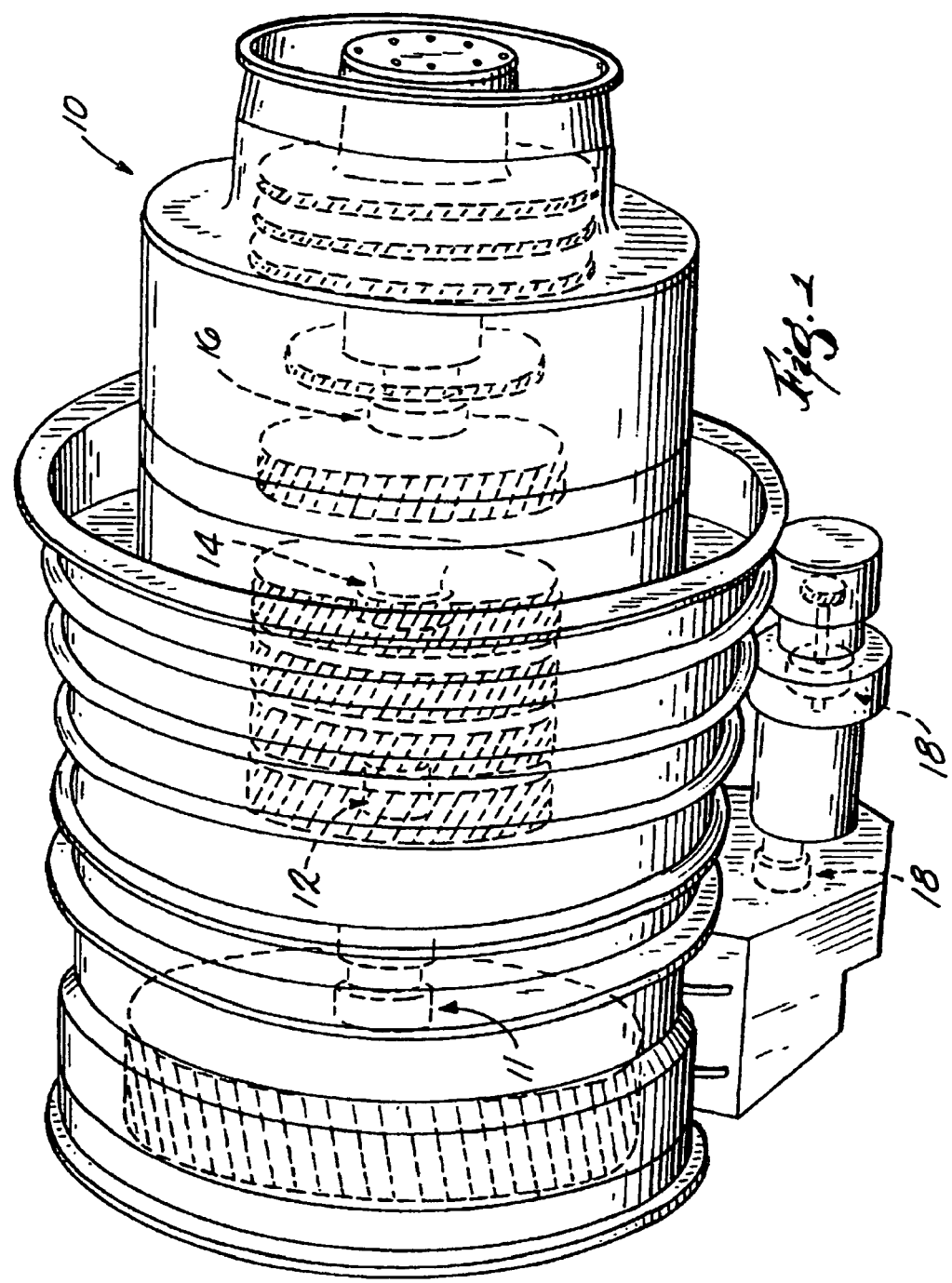
FIG. 1 illustrates the use of hydropad seals in various applications in a gas turbine engine.

FIG. 1 illustrates the use of hydropad seals in an aerospace gas turbine engine 10. It has been discovered that hydropad seals can be used in a variety of positions within the engine 10, and can be used to replace standard (non-hydropad) seals. In FIG. 1, the engine 10 employs use of the hydropad seals as compressor inlet seals 11, compressor/drive seals 12, interstage seals 14, turbine seals 16, and gearbox seals 18. Uses also include accessory seals such as constant speed drives, alternators, starters, generators, de-oilers, fuel pumps, hydraulic pumps, gearboxes, main shafts and fuel control seals (not shown). Hydropad seals provide virtually leakage free operations at temperatures ranging up to about 600 degrees Fahrenheit. The hydropad seals operate with a shaft speed up to 120,000 rpm for small sizes, and can be designed to handle reverse pressures. The hydropad seals can also operate in virtually any fluid, liquid or gas.

FIGS. 2 and 3 illustrate a cross-section of a rotating shaft 20 positioned within a stationary housing 22, and a seal assembly 24 mounted therebetween. The seal assembly 24 includes two seal rings: a mating ring 28 mounted on the shaft 20 for rotation about an axis 38 of rotation substantially coaxial with an axis of rotation of the shaft 20 and a seal nose 30 mounted on the housing 22. A metal bellows 32 is positioned between the housing 22 and a seal nose 30, and allows for axial movement of the seal nose 30.

The mating ring 28 and nose seal 30 may be fabricated from suitable materials known in the art, such as hardened steel, carbon, silicon carbide, carbon composites, ceramics, tungsten carbide, and a combination thereof. Preferably. the mating ring 28 is a ductile material, such as hardened steel.

A working fluid 42 (e.g., oil) is present outside (i.e., on the outer diameter of) the mating ring 28. Air 40 is positioned on the inner diameter of the mating ring 28. The air 40 can be filtered by a filter 45 as schematically shown. The air 40 is preferably at atmospheric pressure, which is substantially less than 14.7 psia (standard absolute pressure at sea level) in the case of an aircraft flying at altitude. As used herein, the phrase "substantially less than 14.7 psia" means that the atmospheric air is what would be experienced by an aircraft flying at altitude. However, the seal assembly 24 can be used at other altitudes, such as sea level, at which atmospheric pressure is above 14.7 psia without departing from the scope of the invention.

As shown in FIG. 3, when the shaft 20 is rotating, the hydropads 26 force the air 40 between the mating ring 28 and the seal nose 30 to create a small gap 56 between the mating ring 28 and the seal nose 30 forming a sealing interface between the mating ring 28 and seal nose 30. As the air 40 is pressurized, a barrier is created inhibiting working fluid 42 from passing through the sealing interface. When the shaft 20 is not rotating, as shown in FIG. 2, the seal nose 30 engages a face 52 of the mating ring 28 and seals the working fluid 42 on the outside of outer circumference 36 of the hydropads 26. Because the hydropads 26 do not extend radially across the entire face 52 of the mating ring 28, the separation of the working fluid 42 from the air 40 is accomplished. Although the present embodiment illustrates a mating ring 28 rotating within the stationary housing 22, it is also possible for the stationary housing 22 to rotate with the mating ring 28 in a fixed position.

Figure 4:
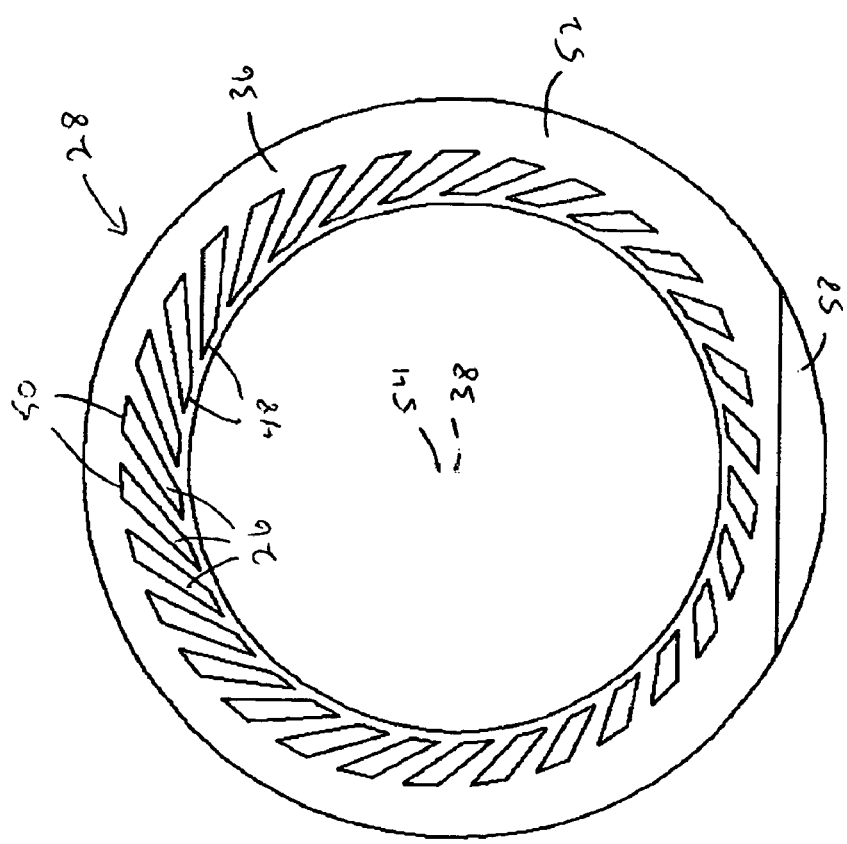
FIG. 4 illustrates a front view of a mating ring having hydropads.

As shown in FIG. 4, a plurality of hydropads 26 are formed on the face 52 of the mating ring 28. Each hydropad 26 formed on the mating ring 28 includes an inner edge 48 joined to an outer edge 50 by a leading edge 44 and a trailing edge 46. The inner edges 48 of the hydropads 26 define an inner circumference that is substantially equidistant from the axis of rotation. The outer edges 50 of the hydropads 26 define an outer circumference, or ring, that is eccentric, i.e. has a center 54 offset relative to the axis 38 of rotation. Advantageously, this eccentric orientation of the hydropads 26 creates lift in an eccentric manner on the face 52 of the rotating mating ring 28.

By applying a lift feature in an eccentric manner on the face 52 of the rotating mating ring 28, a lift force which varies about the circumference of the mating ring 28 is generated. Since the mating ring 28 rotates, the lift force will also vary as a function of time. This varying lift force produces a pumping action (nutation of the faces) that allows the working fluid 42 between the mating ring 28 and seal nose 30 to generate a lift force as a result of a squeeze film effect. The squeeze film effect supplements the lift force created by the hydrodynamic nature of the pattern of the hydropads 26 at lower rotational speeds of the mating ring 28 and fluid densities. Advantageously, the working fluid 42 allowed into the sealing interface initially forms the gap between the mating ring 28 and seal nose and maintain the separation at high altitudes and low rotation speeds. However, as the mating ring 28 rotates, working fluid 42 that is brought into the sealing interface between the mating ring 28 and seal nose 30 from the outer diameter is urged radially outwardly by the radial pumping created by the hydropads to prevent the working fluid 42 from passing through the seal interface.

Figure 5:
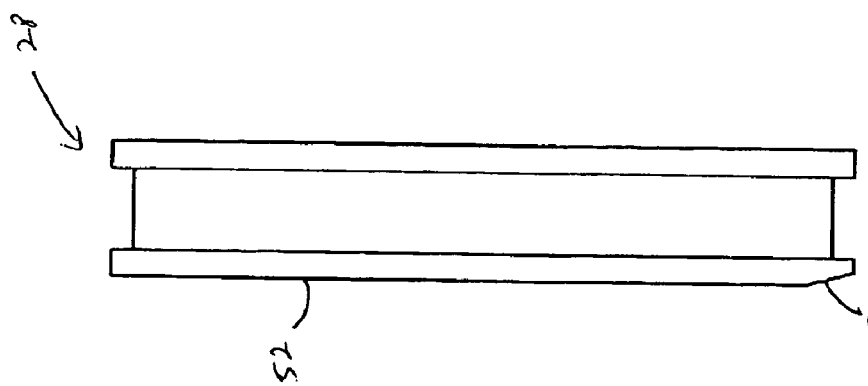
FIG. 5 illustrates a side view of the mating ring of FIG. 3.

Since the working fluid film thickness will be lowest at the point where the hydropads 26 extend the least in the direction of radial pumping, preferably the mating ring 28 is grooved or chamfered at this point to introduce fluid into the sealing interface between the mating ring 28 and seal nose 30, as shown in FIGS. 4 and 5. In the embodiment disclosed herein, the air 40 is pumped from the inner diameter of the mating ring 28 toward the outer diameter of the mating ring 28. Accordingly, in the embodiment disclosed herein, a chamfer 58 is formed on the outer diameter of the mating ring 28. Although forming the chamfer 58 on the mating ring 28 is preferred, the chamfer or groove can be formed on the seal nose 30 instead of, or in addition to, forming the chamfer 58 on the mating ring 28 without departing from the scope of the invention. Moreover, if air or other fluid is pumped from the outer diameter of the seal toward the inner diameter of the seal, preferably a groove or chamfer is formed on the inner diameter of the mating ring and/or seal nose.

Because the working fluid 42 in the sealing interface between the mating ring 28 and seal nose 30 has a higher viscosity than air alone, separation of the seal nose 30 from the mating ring 28 will occur at a lower speed than it would with only air 40 in the interface. This working fluid 42 in the sealing interface helps to reduce heat generation and wear at the interface. Also due the eccentric nature of the lift geometry, the stationary seal nose 30 will tend to tilt relative to the rotating face 52 of the mating ring 28 due to the varying lift force. This tilt will also in essence create a slider bearing geometry which will further supplement the hydrodynamic lift.

FIG. 6 is an enlarged view of a hydropad 26. The preferred configuration of the hydropad 26 is such that the leading edge 44 and the trailing edge 46 diverge radially outwardly and are connected by an inner edge 48 and an outer edge 50. The outer edges 50 of the hydropads 26 define an outer circumference of the hydropads 26 which is eccentric relative to the axis 38 of rotation. Preferably, the inner edge 48 and outer edge 50 are substantially straight and define a nominal center 60 midway between the inner edge 48 and outer edge 50. The nominal centers 60 are circumferentially spaced about the point 54 offset from the axis 38 of rotation further defining the eccentric orientation of the hydropads 26.

The preferred depth of the hydropads 26 varies depending upon the application. The illustrated hydropads 26 consist of many shallow grooves at a given depth of approximately 0.0001 inches to 0.0025 inches, and at a fixed angle about the inner diameter of the sealing face. The depth, number of grooves and angle of the paths are fixed at fixed values and are chosen to meet the given operating conditions as necessary.

The hydropads 26 can be formed on the mating ring using any method known in the art. One preferred method is disclosed in U.S. Pat. No. 6,257,589 which is fully incorporated herein by reference.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A seal assembly comprising:
   a first seal ring of a generally annular shape and defining radial and circumferential directions;
   a second seal ring rotatably mounted about an axis of rotation and positioned in facing relation to said first seal ring to define an interface therebetween;
   a plurality of hydropads formed in one of said first seal ring and second seal ring, each of said hydropads having an inner edge and an outer edge spaced radially outwardly from said inner edge, said inner edges defining an inner circumference of said hydropads and said outer edges defining an outer circumference of said hydropads, and one of said inner circumference and said outer circumference being eccentric relative to said axis of rotation; and
   an entry point formed on a portion of one of an inner circumference and an outer circumference of one of said first seal ring and said second seal ring for introducing fluid between said first seal ring and said second seal ring, said entry point extending past at least two of said hydropads and less than all of said one of an inner circumference and an outer circumference of one of said first seal ring and said second seal ring.

2. The seal assembly as in claim 1, in which said outer circumference of said hydropads is eccentric relative to said axis of rotation.

3. The seal assembly as in claim 1, in which the other of said inner circumference and said outer circumference of said hydropads is substantially equidistant from said axis of rotation.

4. The seal assembly as in claim 1, in which each of said hydropads includes a leading edge interconnecting said inner edge with said outer edge.

5. The seal assembly as in claim 1, in which each of said hydropads includes a trailing edge interconnecting said inner edge with said outer edge.

6. The seal assembly as claimed in claim 1, wherein said hydropads are positioned to pump air from an inner diameter of said seal assembly toward an outer diameter of said seal assembly.

7. The seal assembly as in claim 1, in which said entry point is formed along a portion of said one of said inner circumference and said outer circumference of one of said first seal ring and said second seal ring including where said hydropads extend the least in a direction of pumping, and said entry point does not extend along a portion of said one of said inner circumference and said outer circumference of one of said first seal ring and said second seal ring where said hydropads extend the greatest in the direction of pumping.

8. A seal assembly comprising:
   a first seal ring of a generally annular shape and defining radial and circumferential directions; and
   a second seal ring positioned in facing relation to said first seal ring and rotatably mounted relative to said first seal ring about an axis of rotation;
   a plurality of hydropads formed in one of said first seal ring and second seal ring and providing a lift force which varies about a circumference of said one of said first seal ring and said second seal ring; and
   an entry point formed on a portion of one of an inner circumference and an outer circumference of one of said first seal ring and said second seal ring for introducing fluid between said first seal ring and said second seal ring, said entry point extending past at least two of said hydropads and less than all of said one of an inner circumference and an outer circumference of one of said first seal ring and said second seal ring.

9. The seal assembly as in claim 8, in which each of said hydropads has a nominal center interposed between an inner edge and an outer edge, and said nominal centers are circumferentially spaced about a point offset from said axis of rotation.

10. The seal assembly as in claim 9, in which said inner edges define an inner circumference of said hydropads and said outer edges define an outer circumference of said hydropads, and one of said inner circumference and said outer circumference of said hydropads is eccentric relative to said axis of rotation.

11. The seal assembly as in claim 10, in which said outer circumference of said hydropads is eccentric relative to said axis of rotation.

12. The seal assembly as in claim 10, in which the other of said inner circumference and said outer circumference of said hydropads is substantially equidistant from said axis of rotation.

13. The seal assembly as in claim 9, in which each of said hydropads includes a leading edge interconnecting said inner edge with said outer edge.

14. The seal assembly as in claim 9, in which each of said hydropads includes a trailing edge interconnecting said inner edge with said outer edge.

15. The seal assembly as claimed in claim 8, wherein said hydropads are positioned to pump air from an inner diameter of said seal assembly toward an outer diameter of said seal assembly.

16. The seal assembly as in claim 8, in which said entry point is formed along a portion of said one of said inner circumference and said outer circumference of one of said first seal ring and said second seal ring including where said hydropads extend the least in a direction of pumping, and said entry point does not extend along a portion of said one of said inner circumference and said outer circumference of one of said first seal ring and said second seal ring where said hydropads extend the greatest in the direction of pumping.

17. A seal assembly comprising:
   a first seal ring of a generally annular shape and defining radial and circumferential directions; and
   a second seal ring positioned in facing relation to said first seal ring and rotatably mounted relative to said first seal ring about an axis of rotation;
   a plurality of hydropads formed in one of said first seal ring and second seal ring and defining an eccentric ring about said axis of rotation; and an entry point formed on a portion of one of an inner circumference and an outer circumference of one of said first seal ring and said second seal ring for introducing fluid between said first seal ring and said second seal ring, said entry point extending past at least two of said hydropads and less than all of said one of an inner circumference and an outer circumference of one of said first seal ring and said second seal ring.

18. The seal assembly as in claim 17, in which each of said hydropads generates lift and has an inner edge and an outer edge spaced radially outwardly from said inner edge, said inner edges define an inner circumference of said hydropads and said outer edges define an outer circumference of said hydropads, and one of said inner circumference and said outer circumference of said hydropads defines said eccentric ring about said axis of rotation.

19. The seal assembly as in claim 18, in which said outer circumference of said hydropads is eccentric relative to said axis of rotation.

20. The seal assembly as in claim 18, in which the other of said inner circumference and said outer circumference of said hydropads is substantially equidistant from said axis of rotation.

21. The seal assembly as in claim 17, in which said entry point is formed along a portion of said one of said inner circumference and said outer circumference of one of said first seal ring and said second seal ring including where said hydropads extend the least in a direction of pumping, and said entry point does not extend along a portion of said one of said inner circumference and said outer circumference of one of said first seal ring and said second seal ring where said hydropads extend the greatest in the direction of pumping.

22. A seal assembly comprising:
a first seal ring;
a second seal ring rotatably mounted about an axis of rotation and positioned in facing relation to said first seal ring to define an interface therebetween;
a plurality of hydropads formed in one of said first seal ring and second seal ring and defining an eccentric ring about said axis of rotation; and
an entry point extending along only a portion of one of an inner circumference and an outer circumference of one of said first seal ring and said second seal ring for introducing fluid between said first seal ring and said second seal ring, said entry point extending past at least two of said hydropads along a portion of said one of said inner circumference and said outer circumference of one of said first seal ring and said second seal ring including where said hydropads extend the least in a direction of pumping.

23. The seal assembly as in claim 22, in which and said entry point does not extend along a portion of said one of said inner circumference and said outer circumference of one of said first seal ring and said second seal ring where said hydropads extend the greatest in the direction of pumping.

\* \* \* \* \*